United States Patent
Elliott

(10) Patent No.: US 10,213,721 B2
(45) Date of Patent: Feb. 26, 2019

(54) AIR FILTER ARRANGEMENT

(71) Applicant: Cory Elliott, Columbus, OH (US)

(72) Inventor: Cory Elliott, Columbus, OH (US)

( * ) Notice: Subject to any disclaimer, the term of this patent is extended or adjusted under 35 U.S.C. 154(b) by 292 days.

(21) Appl. No.: 15/140,543

(22) Filed: Apr. 28, 2016

(65) Prior Publication Data

US 2017/0312678 A1 Nov. 2, 2017

(51) Int. Cl.
*B01D 46/00* (2006.01)
*B01D 46/10* (2006.01)
*B01D 46/52* (2006.01)

(52) U.S. Cl.
CPC ......... *B01D 46/0005* (2013.01); *B01D 46/10* (2013.01); *B01D 46/521* (2013.01)

(58) Field of Classification Search
None
See application file for complete search history.

(56) References Cited

U.S. PATENT DOCUMENTS

| | | | | | |
|---|---|---|---|---|---|
| 5,368,622 | A | * | 11/1994 | McMillon | B01D 46/10 55/497 |
| 5,484,529 | A | * | 1/1996 | Malugade | B01D 29/23 210/448 |
| 6,264,713 | B1 | * | 7/2001 | Lewis, II | B01D 46/0005 55/481 |
| 6,406,509 | B1 | * | 6/2002 | Duffy | B01D 46/0001 156/212 |
| 6,521,011 | B1 | * | 2/2003 | Sundet | B01D 46/0001 55/497 |
| 8,157,881 | B1 | * | 4/2012 | Anoszko | B01D 46/0005 55/497 |
| 2003/0159415 | A1 | * | 8/2003 | Parker | B01D 46/0005 55/481 |
| 2003/0230062 | A1 | * | 12/2003 | Kubokawa | B01D 46/0005 55/497 |
| 2004/0172928 | A1 | * | 9/2004 | Kubokawa | B01D 46/0005 55/497 |
| 2005/0138906 | A1 | * | 6/2005 | Kubokawa | B01D 29/07 55/497 |
| 2006/0168926 | A1 | * | 8/2006 | Dawson | B01D 39/16 55/502 |
| 2007/0113741 | A1 | * | 5/2007 | Shiau | B01D 46/0023 96/154 |
| 2009/0320426 | A1 | * | 12/2009 | Braunecker | B01D 46/0013 55/511 |

(Continued)

*Primary Examiner* — Amber R Orlando
*Assistant Examiner* — Brit E. Anbacht
(74) *Attorney, Agent, or Firm* — John R. Benefiel

(57) ABSTRACT

An air filter arrangement incorporates a replaceable pleated air filter element which is installed in a rectangular frame. The air filter element is collapsible by flattening together the pleats and placed in an opening in the frame and thereafter stretched apart to extend across the space opposite frame sides and held in that position, by a magnetic element on the end pleat at either end of the air filter element. Sealing pads made of a material similar to the filter element panels are secured to the other two opposite frame sides which engage respective opposite ends of the air filter element for reducing air flow around the pleat ends. A planar lattice restraint is held in a perimeter slot extending around the frame opening to prevent contact of the air filter element and the lattice restraint to minimize the risk of holes being torn in the filter element by such contact.

7 Claims, 4 Drawing Sheets

(56) References Cited

U.S. PATENT DOCUMENTS

| | | | |
|---|---|---|---|
| 2011/0126500 A1* | 6/2011 | Whittemore | B01D 46/0005 55/501 |
| 2012/0148398 A1* | 6/2012 | Campbell | F03D 11/00 415/214.1 |
| 2012/0240848 A1* | 9/2012 | Amundsen | B01D 46/10 118/429 |
| 2013/0125520 A1* | 5/2013 | Gorman | B01D 46/0002 55/509 |
| 2013/0133301 A1* | 5/2013 | Sproule | B01D 46/0002 55/480 |
| 2013/0219844 A1* | 8/2013 | Sullivan | B01D 46/0001 55/496 |
| 2014/0230385 A1* | 8/2014 | Schuld | B01D 46/0004 55/481 |
| 2015/0267927 A1* | 9/2015 | Zhang | F24F 3/1603 55/493 |
| 2017/0182445 A1* | 6/2017 | Zhang | B01D 46/0016 |

* cited by examiner

AIR FILTER ARRANGEMENT

BACKGROUND OF THE INVENTION

This invention concerns air filters and more particularly disposable air filters of a type in common use with heating, air conditioning and ventilation (HVAC) systems.

Such filters are designed to be disposable since they become dirty and clogged in a relatively short time and are not easily cleanable.

The usual arrangement invoices generally planar fibrous air filter element fixed in a paperboard frame which supports the air filter element.

The filter element and frame being integrally connected together are discarded as a unit.

A significant disadvantage of such disposable air filters, is that their relative bulkiness increases the shipping costs and may occupy significant storage space if large numbers of filters are involved.

For this reason, it would be advantageous if the filters could be made to be more compact for shipping and storage.

One approach is to make the filter elements separable from the frame and to be configured to be able to be folded up for storage and then expanded when installed in the frame.

The filter elements themselves could then be kept in a compact state when being stored or shipped. However, it is important that the filter be easily installed in the frame and would not allow excessive bypass of unfiltered air flow around the separate filter element.

Disposable air filter elements usually need to be installed with a planar restraint such as a metal screen or lattice also held in the frame so as to prevent the filter element from being dislodged as a result of forces exerted on the element by the air flowing through the filter element.

Air filter elements are also typically made of porous paper or fiber and are somewhat vulnerable to being torn or otherwise damaged by incidental contact with the planar restraint, allowing unfiltered air to pass through the tears in the filter element.

Another desirable feature of such filters is that the air filter element should be easily and quickly installed so as to be sealed to the frame to minimize the volume of unfiltered air flowing around the filter element.

It is an object of the present invention to provide an air filter of a type in which a filter element is separable from a permanent holder frame and is easily folded up into a compact state when not in service, such as when being shipped or stored, but easily expanded after being installed in a frame to be placed in service.

It is a further object of the present invention to provide such a separable filter element which is protected from being torn by being contacted with an associated filter element restraint.

It is yet another object to provide a sealing engagement between the expanded filter element and the frame which minimizes the volume of air flow around the air filter element.

SUMMARY OF THE INVENTION

The above recited objects of the invention and other objects which will be understood by those skilled in the art are achieved by an air filter element comprised of a fibrous sheet material formed in a pleated configuration which is expandable from a flattened compressed state by stretching the pleats apart thereof to be configured to extend completely across a rectangular opening in a permanent frame. Each pleat on a respective end of the filter element has an attached magnetic element which will be attracted to a respective side of a first pair of opposite sides of the frame to hold the filter element in an expanded state with the pleated filter element expanded to extend completely across the frame opening.

A lattice restraint panel is installed on one side of the frame occupying the frame opening to provide a restraint against excessive bulging of the expanded filter element when air is flowing through the same filter. A flange is interposed between the perimeter of the filter element and adjacent portions of the lattice restraint to prevent direct contact with the filter element and thereby minimize tearing of the filter element by direct contact with the lattice restraint.

A pad of a similar or identical type of fibrous material forming the air filter element is disposed on an inside surface of a second pair of opposite sides of the frame which are contacted by the opposite ends of the pleats to establish a sealing engagement blocking the flow of air around the filter element.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
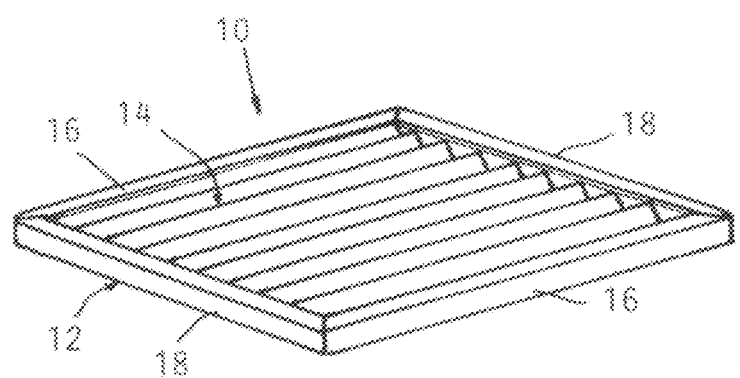
FIG. 1 is a pictorial view of an air filter arrangement according to the present invention disposed in a horizontal position.

Referring to the drawings and particularly FIG. 1, the air filter arrangement 10 according to the invention is comprised of a rectangular formed steel open frame 12 and a pleated filter element 14 installed therein and formed from a porous fibrous sheet material. The frame 12 is made up of opposite pairs of sides 16, 18, each comprised of channels of a formed metal construction.

The pleated filter element 14 is collapsible into a stack of layers by folding the pleats 19 flat together, greatly reducing their volume for storage and shipping. The pleats 19 are shown in a partially folded up condition in FIG. 2.

The pleats 19 are captured between the channel legs 20 of the first pair of opposite frame sides 18.

Figure 4:
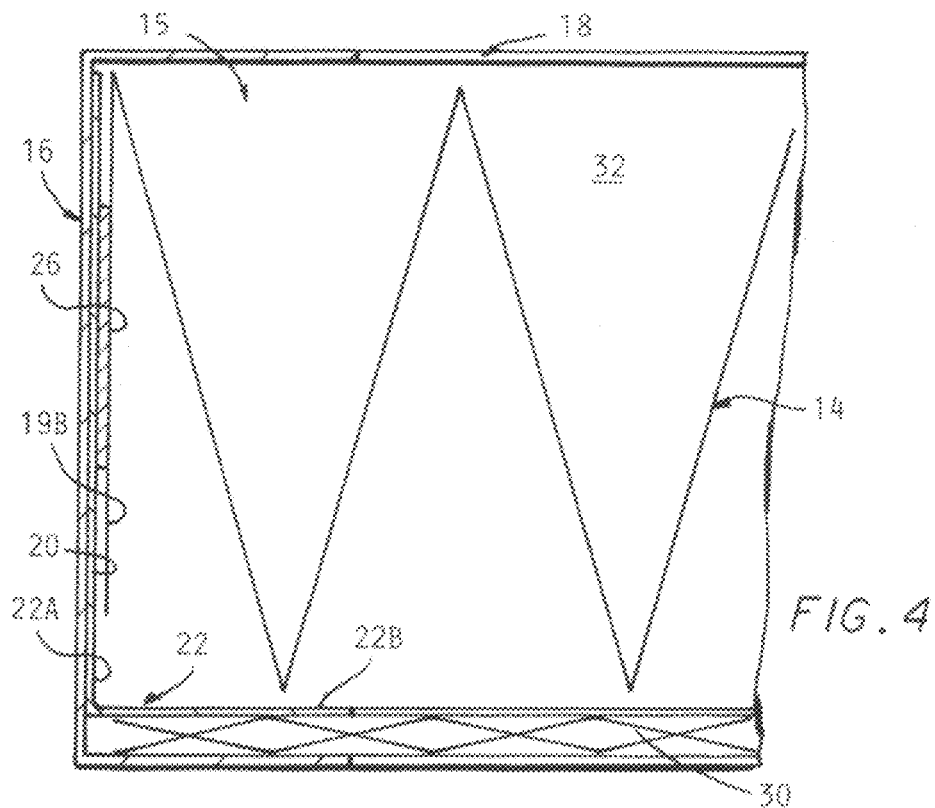
FIG. 4 is a fragmentary sectional view of a corner of the air filter arrangement shown in FIG. 1 in a horizontal orientation along a direction defined by the length of the pleats of the air filter element.
Figure 5:
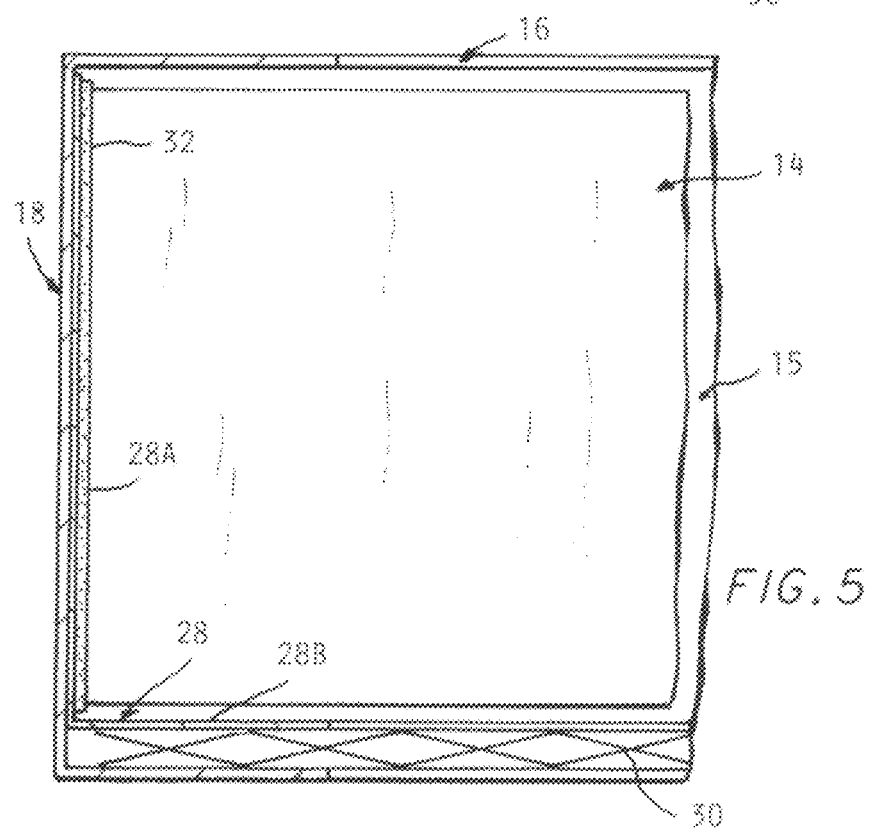
FIG. 5 is a fragmentary sectional view of an air filter arrangement along a direction normal to the pleats of the filter element.

To install the air filter element 14, the pleats 19 are folded flat together to form a compact stack of pleat sides. The collapsed air filter element 14 can then be angled to be inserted within the opening 15 defined by the frame and within the space defined by the channel 20 of the pairs of sides 16, 18 and then straightened out to be captured therein. The pleats 19 are then pulled apart to be opened to completely occupy in opening of the frame 12 by the air filter element 14, bringing the last pleat at either end 19A (FIG. 2) and 19B (FIG. 4) against a flange portion 22A, and an L shaped piece 22 thereafter installed against the bottom wall 24 of the sides 16.

Each end pleat 19A, 19B has a magnetized strip 26 attached thereto which is attracted to the main wall 22A of the L shaped piece 22 and the wall 24 of the sides 16 to be securely held thereagainst to stabilize the filter element 14 in its expanded state and completely extending across the frame opening 15.

This completes the installation of the air filter element 14 in the frame 12.

Figure 2:
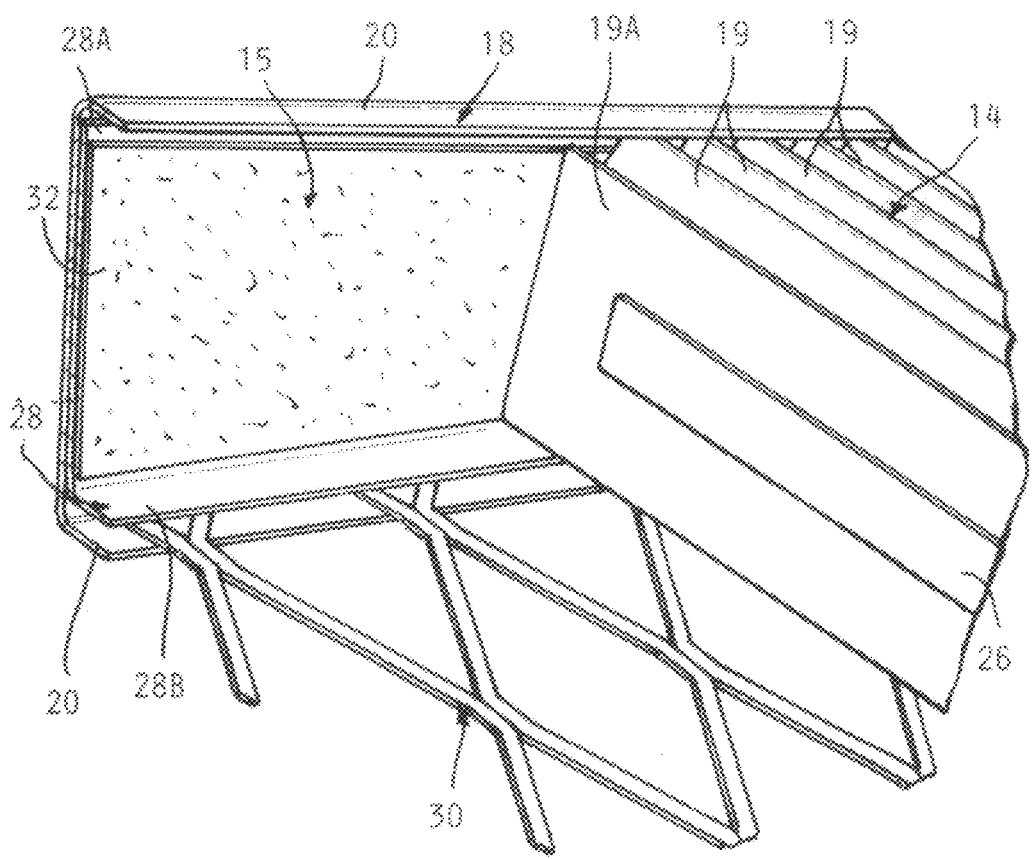
FIG. 2 is an enlarged fragmentary sectional view of a corner portion of the air filter arrangement shown in FIG. 1 with the air filter element partially folded up within a frame.
Figure 3:
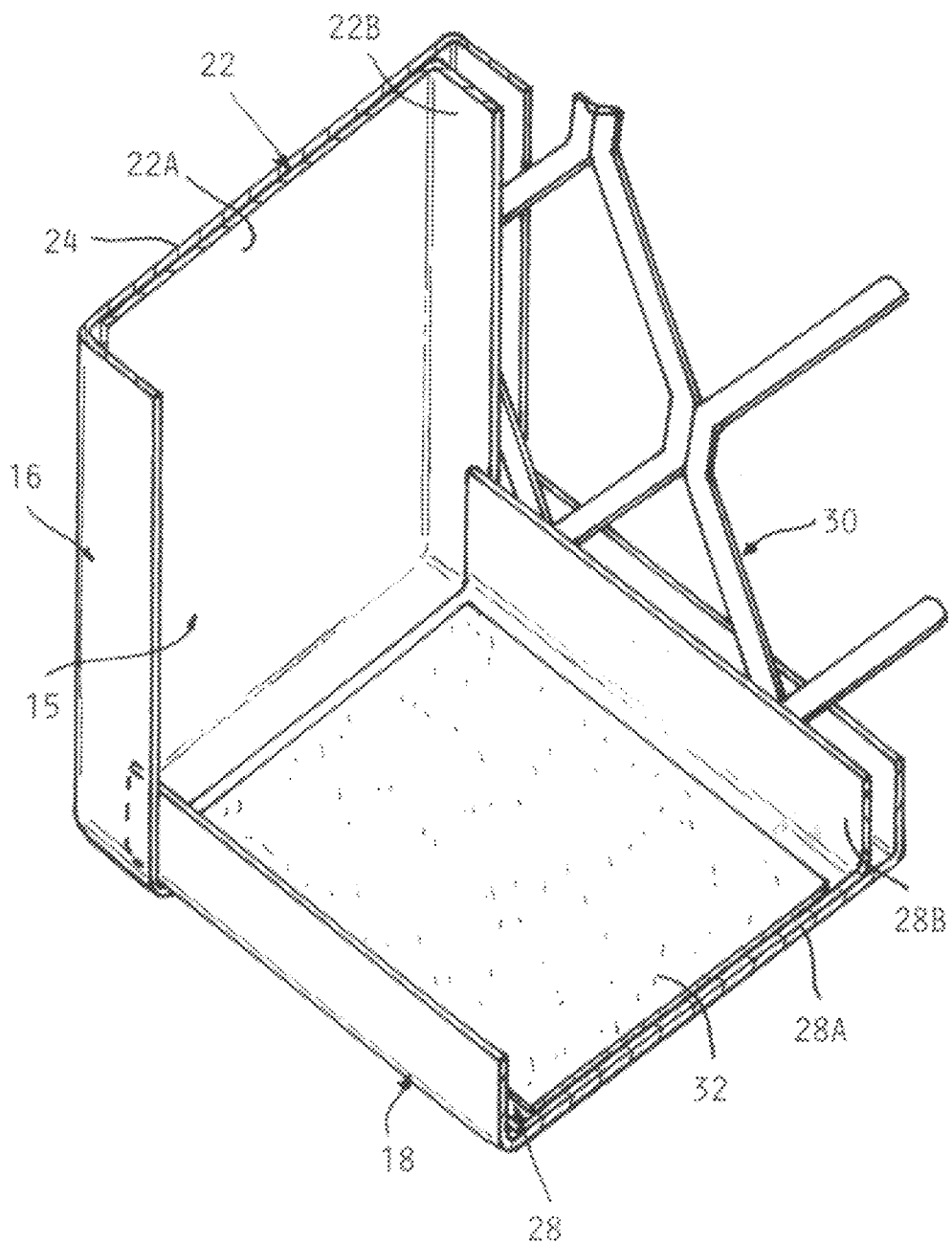
FIG. 3 is an enlarged fragmentary sectional view of a corner of the air filter arrangement shown in FIG. 1 but in an upright vertical position and with the air filter element removed.

The removable L shaped pieces 28 each have a main portion 28A and a flange 28B installed to be disposed against each inside wall of frame sides 18 (FIGS. 2, 3).

The sides 22A, 28B of the pieces 28 overlap slightly in the corners as seen in FIG. 3.

The pairs of sides 22B, 28B overlie the insides of a lattice restraint 30 to protect the filter element 14 from any contact therewith which could cause a tearing of the filter element 14.

The lattice restraints 30 are shown somewhat diagrammatically as having substantial thickness in FIGS. 4-7 for clarity, but are preferably of a flat configuration as seen in FIGS. 2 and 3.

Figure 6:
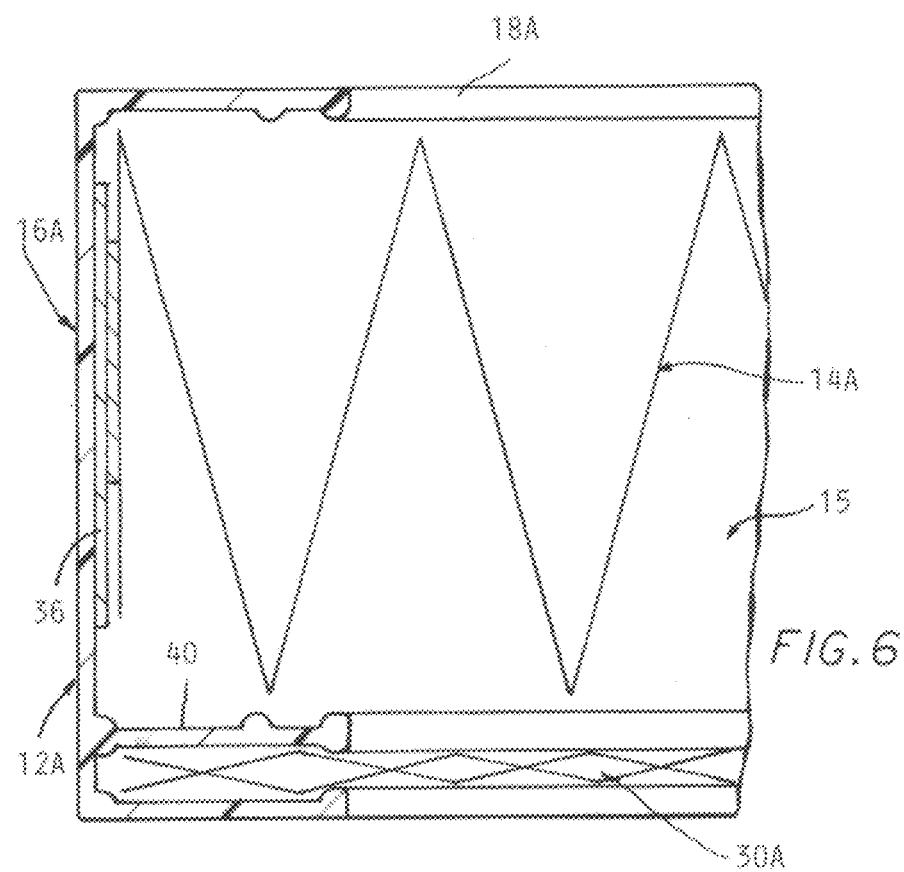
FIG. 6 is a fragmentary sectional view of an air filter arrangement of an alternative embodiment thereof in a direction parallel to the pleats of the filter element.
Figure 7:
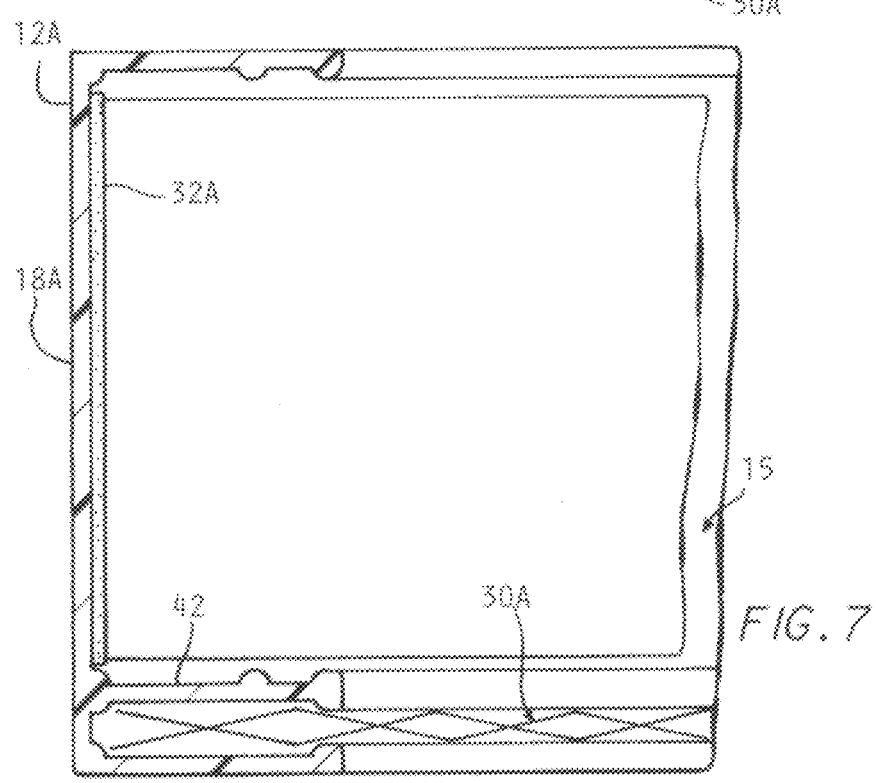
FIG. 7 is a fragmentary sectional view of the air filter arrangement shown in FIG. 6 in a horizontal orientation but from a direction normal to the length of the pleats of the air filter element.

The frame 12 side members 16, 18 may also be made as aluminum extrusions with an integral slot 38 for the lattice restraint 30, which is thereby permanently held in the frame 12 similar to the molded plastic construction shown in FIGS. 6 and 7.

As mentioned, the sides of the frame 12A can also be made of a molded plastic construction as shown in FIGS. 6 and 7.

In this case, a magnetic piece 36 is attached to the bottom inside surface of the frame sides 16A so as to create an attraction to the magnetic strip 26 on the filter element end pleats 19A, 19B to hold the end pleats 19A, 19B against the frame members 16A and thereby hold the filter element 14 completely occupying the opening 15 in the frame 12 in the expanded condition.

The slot 38 for the lattice restraint 30A (which can be made of plastic or netting) is created by an inner molded wall 40 in each of the wall sides 16A and 42 in sides 18A.

A sealing panel is mounted to the side 18A as in the first described embodiment, in order to minimize any air flow around the ends of the pleats 19, comprised of a pad 32 of fibrous material preferably similar to the material from which the filter element 14 is made, which is installed on the inside of each of the frame members 18 so as to engage the ends of the pleats 19. The ends of the pleats 19 engage the pad 32 and tend to become interconnected to minimize air flow past the ends of the pleats 19.

The invention claimed is:

1. An air filter arrangement comprising:
an open rectangular frame comprised of four frame sides joined together and defining a frame opening;
an air filter element comprised of a pleated sheet of porous material said pleats together making up said air filter element able to be expanded by pulling said pleats apart to respective end of said frame to fill said frame opening;
a magnetic element attached to each pleat at an end of said air filter element magnetically attracted to a respective one of said pair of opposite frame sides to hold said air filter element in an expanded state drawn across said frame opening;
a filter element lattice restraint held within said frame opening on one side of said expanded air filter element and secured therein;
a slot defined on one side of each of said frame four sides receiving perimeter edges of said lattice restraint with said air filter element spaced outside said slot to minimize contact therebetween.

2. The air filter arrangement according to claim 1 wherein each of said slots are formed by a removable L shaped sheet piece having one leg thereof positioned against the inside of an associated frame side and a second leg thereof projecting out into said opening parallel with but spaced to one side of said frame side so as together define said slot therebetween with said lattice restraint held therein.

3. The air filter according to claim 1 wherein said frame sides are molded with said slot defined to the inside thereof.

4. An air filter arrangement comprising an open rectangular frame comprised of four frame sides joined together and defining a frame opening;
an air filter element comprised of a pleated sheet of porous material, said pleats together making up said air filter element able to be expanded by pulling said pleats apart to respective ends of said frame to fill said frame opening;
a magnetic element attached to a pleat at each end of said air filter element magnetically attracted to a respective one of said opposite frame sides to hold said air filter element in an expanded state drawn across said frame opening; and,
a fibrous sealing pad secured against an inside surface of each of a second pair of opposite frame sides whereat ends of said pleats are juxtaposed to be in contact therewith and thereby block air from flowing around said ends of said pleats of said air filter element.

5. The air filter arrangement according to claim 4 wherein said fibrous material of said fibrous sealing pads are made of a substantially similar material from which said air filter element is made.

6. The air filter arrangement according to claim 3 wherein said frame sides are molded from a plastic material and a magnetic portion is attached to said first pair of opposite frame sides adjacent said magnetic elements to attract a respective magnetic element to hold said air filter element in an expanded state extending across said frame opening.

7. The air filter arrangement according to claim 4 wherein each of said frame sides are of a channel shape and said pleats at either end of said air filter element are received within said channel shape of said first pair of opposite frame sides and said sealing pads are mounted to a bottom wall of said channel shape of said second pair of opposite frame sides.

* * * * *